(12) United States Patent
Montgomery et al.

(10) Patent No.: US 6,858,967 B2
(45) Date of Patent: Feb. 22, 2005

(54) RING ASSEMBLY FOR MECHANICALLY CLAMPING A STATOR CORE WITH CORE-END MAGNETIC FLUX SHUNTS IN A DYNAMOELECTRIC MACHINE

(75) Inventors: Lon Montgomery, Winter Springs, FL (US); Aleksandar Prole, Winter Springs, FL (US); Klaus Sedlazeck, Muelheim (DE)

(73) Assignee: Siemens Westinghouse Power Corporation, Orlando, FL (US)

( * ) Notice: Subject to any disclaimer, the term of this patent is extended or adjusted under 35 U.S.C. 154(b) by 15 days.

(21) Appl. No.: 10/464,298

(22) Filed: Jun. 18, 2003

(65) Prior Publication Data

US 2004/0256947 A1 Dec. 23, 2004

(51) Int. Cl.[7] .................................. H02K 3/46
(52) U.S. Cl. ..................................... 310/260
(58) Field of Search .......................... 310/216, 217, 310/254, 259, 260, 270, 91

(56) References Cited

U.S. PATENT DOCUMENTS

| | | | |
|---|---|---|---|
| 3,949,257 A | * | 4/1976 | Cooper et al. ............. 310/260 |
| 3,991,334 A | * | 11/1976 | Cooper et al. ............. 310/260 |
| 4,258,281 A | | 3/1981 | Calfo et al. |
| 4,314,173 A | | 2/1982 | Srdoch |
| 5,355,046 A | * | 10/1994 | Weigelt ..................... 310/260 |
| 5,798,595 A | * | 8/1998 | Nilsson et al. ............. 310/260 |
| 5,926,939 A | | 7/1999 | Konrad et al. |

OTHER PUBLICATIONS

Dr. K. Weigelt, "Large ABB Turbogenerators and their Auxiliaries," Asea Beown Boveri Ltd., Publication No. KWDV1 B11 012 E, Printed in Switzerland, 20 pages. (No date).

* cited by examiner

Primary Examiner—Tran Nguyen

(57) ABSTRACT

An assembly for mechanically clamping a laminated steel stator core including laminated steel core-end magnetic flux shunts in a dynamoelectric machine is provided. The flux shunt at each end of the stator core includes first and second surfaces for receiving the clamping assembly. The first and second surfaces may be arranged to define a step. The clamping assembly includes an inner support ring configured to engage an entire 360° circumference of the first receiving surface of the flux shunt. The clamping assembly further includes an outer support ring configured to engage an entire 360° circumference of the second receiving surface of the flux shunt. The respective mechanical engagement provided by the inner and outer rings relative to the flux shunt is circumferentially continuous.

14 Claims, 3 Drawing Sheets

RING ASSEMBLY FOR MECHANICALLY CLAMPING A STATOR CORE WITH CORE-END MAGNETIC FLUX SHUNTS IN A DYNAMOELECTRIC MACHINE

FIELD OF THE INVENTION

The present invention is generally related to dynamoelectric machines, and, more particularly, to a ring assembly for mechanically clamping the stator cores and core-end flux shunts of large generators.

BACKGROUND OF THE INVENTION

It is known to use rather complicated structures to provide appropriate protection to the stator core ends of a dynamoelectric machine, such as a generator, turbogenerator, etc., from the effects of a fringing magnetic flux present within the end regions of the machine.

As shown in FIG. 1, for generators having a relatively large electromagnetic utilization, it is known to use a laminated flux shunt 10 at each end of the stator core 12. As better appreciated in FIG. 2, the laminated flux shunt has been mechanically clamped to the core 12 by circumferentially spaced-apart core support plates 14. The plates 14 are segmented to reduce their vulnerability to overheating when exposed to the fringing magnetic flux. For example, in a prior art arrangement of 18 discrete support plates, each support plate would typically extend approximately no more than 20 degrees of arc. Because the flux shunt 10 presents a stepped surface, each core support plate is made up of an outer plate section 16 connected through a step 17 to an inner plate section 18. Respective sets of insulated outer and inner bolts 22 and 24 are used to fasten the outer and inner plate sections 16 and 18 to the core.

Prior art support plates 14 have commonly been made from non-magnetic stainless steel or iron castings with a relative magnetic permeability of less than 1.05 times the permeability of free space to further reduce their vulnerability to overheating when exposed to the fringing magnetic flux. The low permeability and segmented shape requirements have led to some complexities in the design and manufacture of the end region of the stator core and associated structures, such as a structure 25 for bracing the end turns 26 of a stator winding. These design complexities may incrementally add to the cost of the generator and may not be conducive to reducing maintenance operations that may be required for servicing the machine.

SUMMARY OF THE INVENTION

The inventors of the present invention have innovatively recognized a ring assembly that in part because of its structural simplicity allows for providing an improved means for mechanically clamping a stator core and associated core-end magnetic flux shunts of a dynamoelectric machine. The proposed ring assembly is effective both in providing a means to transmit the mechanical clamping loads of the bolts used to mechanically consolidate the core laminations into a solid assembly and also in protecting both the clamping assembly and core ends against overheating of the core and of the flux shunt due to the fringing magnetic flux present at the end regions of the core.

In one exemplary embodiment, the ring assembly can be made from a material, such as stainless steel, having a relative magnetic permeability as high as about 1.5 times than the permeability of free space. That is, having a relative permeability higher than the traditional 1.05 limit imposed on previous designs. This is desirable since a higher relative permeability allows use of lower-cost materials for the ring assembly. In addition, this ring assembly is much simpler to construct and service (therefore less expensive yet mechanically superior) than flux shunts with segmented core support plates. Also, because of the circumferentially continuous nature of the ring assembly, associated structures, such as a structure that provides bracing to the end turns of a stator winding, can be more easily and securely attached to the ring assembly, thus enhancing the robustness of the mechanical design of the machine.

Generally, the present invention fulfills the foregoing needs by providing in one aspect thereof an assembly for mechanically clamping a stator core and associated core-end magnetic flux shunts of a dynamoelectric machine. The flux shunt at each end of the stator core comprises first and second surfaces for receiving the clamping assembly. The first and second receiving surfaces of the flux shunt may be arranged to define a step. The core clamping assembly comprises an inner support ring configured to engage an entire 360° circumference of the first receiving surface of the flux shunt. The core clamping assembly further comprises an outer support ring configured to engage an entire 360° circumference of the second receiving surface of the flux shunt. The respective mechanical engagement provided by the inner and outer rings relative to the flux shunt is circumferentially continuous, thereby reducing or avoiding the formation of areas subject to high concentration of mechanical stress, as would be the case with a circumferentially segmented support structure.

BRIEF DESCRIPTION OF THE DRAWINGS

These and other advantages of the invention will be more apparent from the following description in view of the drawings that show.

DETAILED DESCRIPTION OF THE INVENTION

During the design and development of a stator core for a new generator series with relatively higher power ratings to be purveyed by the assignee of the present invention, the mechanical design team observed the desirability of reducing by half the number of insulated bolts for clamping the stator core and supporting a magnetic flux shunt relative to the stator core in a prior art design. For one example member of this series that previously would have been designed with 42 insulated bolts, this reduction in the number of bolts would have left for the designer just 21 bolts for affixing the prior art segmented support plates to the respective ends of the stator for mechanically clamping the core and the core-end flux shunts. For this example case, in order to provide a mechanically reliable connection to each discrete support plate, the designer would have had to approximately triple the arc length of each support plate.

The prior art, however, teaches away from such an increase in arc length because of the possibility of overheating of such large plates as well as overheating at the end regions of the stator core. Facing such a situation, the inventors of the present invention recognized an innovative solution that defied the long-standing and orthodox thinking in connection with such prior art segmented support plates. Namely, the longstanding traditional thinking in this art was that a number of circumferentially discrete segments having a relatively short arc length were necessary to avoid unacceptable overheating at the end regions of the core due to the fringing magnetic flux present at such end regions. The inventors recognized a ring assembly (i.e., a circumferentially continuous assembly, the antithesis of the discrete segments taught by the prior art) that not only has improved the mechanical clamping of the core and core-end flux shunts but also has appropriately met the magnetic shielding requirements for the proposed core, even in the presence of relatively higher levels of fringing flux, such as will be the case in a generator with increased power ratings.

Figure 3:
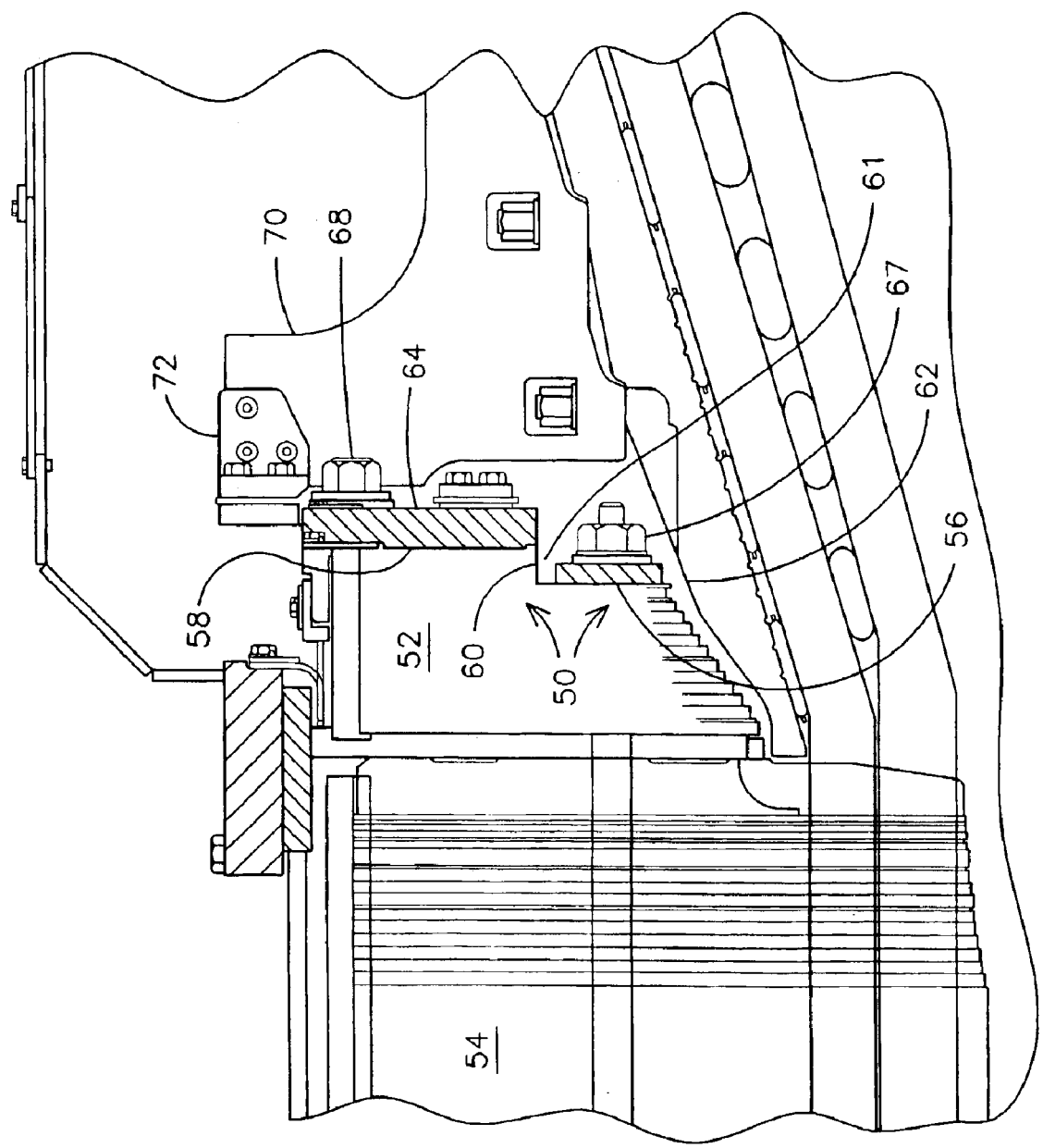
FIG. 3 is a cross-sectional view that shows one end of a stator core with a magnetic flux shunt clamped by a ring assembly in accordance with aspects of the present invention.

FIG. 3 shows an assembly 50 for mechanically clamping a stator core 54 and associated core-end magnetic flux shunts 52 in a dynamoelectric machine. In one exemplary embodiment, flux shunt 52 comprises a plurality of laminae arranged to define first and second surfaces 56 and 58 for receiving the clamping assembly 50. The first and second surfaces 56 and 58 may be arranged to define a step 60.

In one exemplary embodiment, the assembly 50 comprises an inner support ring 62 configured to circumferentially engage the first receiving surface 56 of the flux shunt. Assembly 50 further comprises an outer support ring 64 configured to circumferentially engage the second receiving surface 58 of the flux shunt. Thus, the respective mechanical engagement provided by the inner and outer rings is continuous over an entire 360° circumference. This is a significant advantage over a segmented arrangement of core support plates since the segmented arrangement has a tendency to create undesirable concentrations of mechanical stress. In addition, accumulated mechanical tolerances in the segmented arrangement may introduce mechanical misalignment since the diameter of the core is relatively large, (e.g., approximately in the order of 10 feet).

In one exemplary embodiment, the inner support ring 56 and the outer support ring 58 are spaced apart from one another through an axial gap 61 between such rings. Preferably, axial gap 61 is in correspondence with the step 60 formed between the receiving surfaces of the flux shunt.

Each ring may be made of any non-magnetic metals or alloys provided that the permeability is sufficiently low, the mechanical strength is sufficiently high, and the conductivity (electrical I thermal) meets the electrical and thermal requirements of any given application. In one exemplary embodiment each ring may be made of metal or alloy materials having a relative permeability greater than 1.05 and of up to about 1.5. Examples of such metals and/or alloys may comprise pure low oxygen copper, pure high oxygen copper. Examples of such metals and/or alloys may also include alloys of copper including chromium copper, chromium-cadmium copper, silver-bearing copper, beryllium copper, nickel copper, tin bronze, aluminium bronze, brass, and other wrought grades and compositions. Examples of such metals and/or alloys may also include aluminium and aluminium alloys, including all the wrought grades such as 1100, 2024, 3003, 6061, 7075, and other wrought grades and compositions. Examples of such metals and/or alloys may also include pure nickel and alloys of nickel such as 600, 706 and 718. Examples of such metals and/or alloys may also include austenitic iron alloys, including the various chromium-nickel and chromium-nickel stabilized grades (so-called austenitic stainless steels), such as 304, 316, 347, etc. and the various manganese and manganese-chromium, manganese-nickel-chromium grades, both carbon-hardened and/or nitrogen-hardened.

A plurality of inner through bolts 67 may be used for affixing the inner support ring 62 to the flux shunt and the stator core. A plurality of outer through bolts 68 may be used for affixing the outer support ring 64 to the flux shunt and the stator core. Proper selection of the number, size and torque of the bolts will result in an essentially uniform level of clamping pressure being applied around the circumference of each ring 62, 64.

Figure 1:
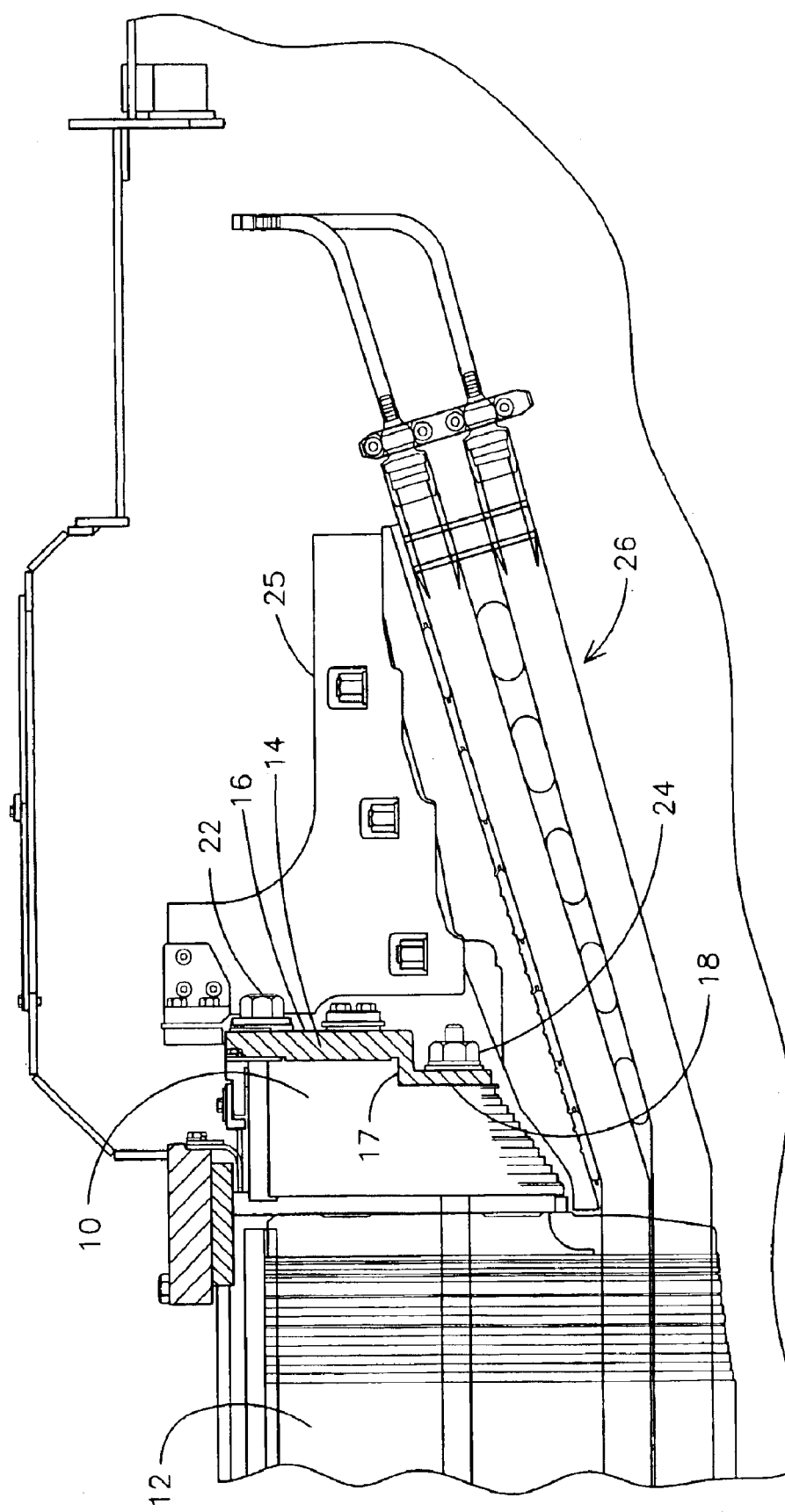
FIG. 1 is a cross-sectional view that shows one end of a stator core with a magnetic flux shunt clamped by a plurality of segmented core support plates in accordance with one exemplary traditional design.
Figure 2:
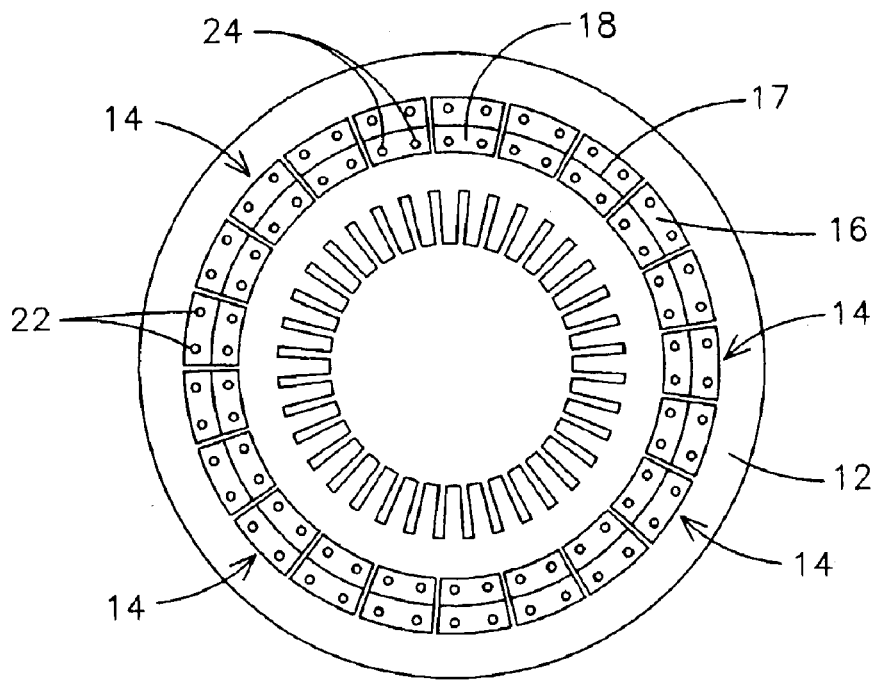
FIG. 2 is an elevational view of the segmented core support plates of FIG. 1.
Figure 4:
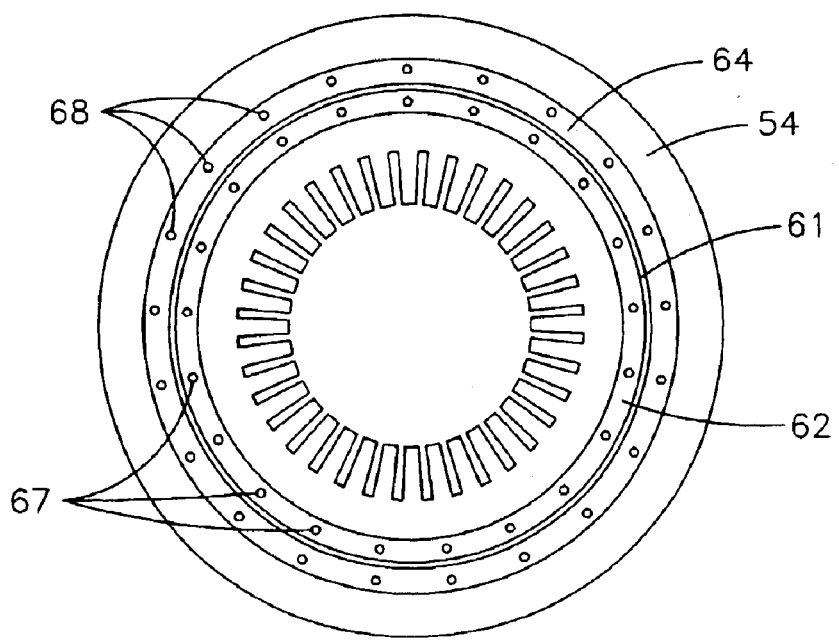
FIG. 4 is an elevational view of the ring assembly of FIG. 3, as mounted at the end region of a stator core.

Using computational tools, such as three-dimensional electromagnetic analysis tools, the inventors of the present invention have calculated that the two-ring assembly shown in FIGS. 3 and 4 can provide acceptable electromagnetic shielding to the end regions of the stator core. This performance is acceptable even at the higher power densities (e.g., 25% higher than power levels in a baseline design) proposed for a newly uprated class of generators to be purveyed by the assignee of the present invention. An exemplary range of power levels for generators that may benefit from a ring assembly in accordance with aspects of the present invention may be from approximately 200 MVA to approximately 1400 MVA and likely even higher. More specifically, this upper range value is not based on any known operational limitations of the ring assembly. This upper range value simply reflects the highest power levels achievable to date with large generators, such as those purveyed, (or to be purveyed in the near future) by the assignee of the present invention. Analysis indicates that losses due to heating of the ring assembly would be so low as to be indiscernible in the efficiency calculations of the generator. Further, the temperature in the ring assembly is expected to be kept within acceptable limits without having to redesign the ventilation arrangements planned for the stator core of the uprated generators.

As will be appreciated by those skilled in the art, a ring assembly having the dimensions used for large generators could be manufactured by forging suppliers who use a ring-rolling process to make stainless steel rings of such dimensions for industrial and aerospace applications. It will be understood, however, that the ring assembly of the present invention is not limited to rings manufactured using a ring-rolling process since any ring having the appropriate mechanical stiffness and magnetic characteristics could be effectively used.

In another advantageous aspect of the present invention, it has been found that a circumferentially continuous ring assembly provides a substantial improvement to a mechanical interface provided by the ring assembly to a structure 70 that provides bracing to the end turns of a stator winding. This is a significant advantage considering that the mechanical loads that may be imparted through the bracing structure to the ring assembly can be quite large. For example, in the event of an electrical short in the power system, a large level of current may be circulated through the stator windings, and this may result in large levels of forces to the bracing structure, which is mechanically connected to the ring assembly. In addition, it is much easier to find a suitable mounting location for the bracing structure along a circumferentially continuous structure, as opposed to finding such a location along circumferentially discrete locations, as would be the case in a prior art segmented support structure. In one exemplary embodiment, a bracket 72, bolted to bracing structure 70, may be affixed to outer support ring 64.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. An assembly for mechanically clamping a stator core in a dynamoelectric machine, said dynamoelectric machine including at said stator core laminated core-end magnetic flux shunts, each of said flux shunts having first and second surfaces for receiving the clamping assembly, said first and second surfaces arranged to define a step, the assembly comprising:

an inner support ring configured to engage an entire 360° circumference of the first receiving surface of the flux shunt; and an outer support ring configured to engage an entire 360° circumference of the second receiving surface of the flux shunt, wherein said inner support ring and said outer support ring constitute separate individual rings, and further wherein each of said rings has a continuous annular cross section so that the respective engagement provided by the inner and outer rings is circumferentially continuous.

2. The assembly of claim 1 wherein the inner support ring and the outer support ring are spaced apart from one another to define an axial gap in correspondence with the step between the receiving surfaces of the flux shunt.

3. The assembly of claim 1 wherein each ring comprises a magnetically permeable material having a permeability of greater than 1.05 to 1.5 times a permeability of free space.

4. The assembly of claim 1 further comprising a first plurality of bolts engaged about the circumference of the inner support ring to provide primary mechanical clamping of the entire stator core, core-end flux shunts included, with a uniform level of clamping pressure around the circumference.

5. The assembly of claim 1 further comprising a second plurality of bolts engaged about the circumference of the outer support ring to provide supplementary mechanical clamping of the entire stator core, core-end flux shunts included, with a uniform level of clamping pressure around the circumference.

6. The assembly of claim 1 wherein the outer support ring comprises a mechanical interface for an assembly for bracing the end turns of a stator winding.

7. A dynamoelectric machine comprising:

a stator core comprising a plurality of layers of laminations of electrical steel;

two magnetic flux shunts, each comprising a plurality of layers of laminations of electrical steel and situated at each end of the stator core;

a clamping assembly for mechanically clamping the stator core and the two core-end magnetic flux shunts of the dynamoelectric machine, each flux shunt comprising first and second surfaces for receiving the clamping assembly, said first and second surfaces arranged to define a step, the clamping assembly comprising:

an inner support ring configured to engage an entire 360° circumference of the first receiving surface of the flux shunt; and an outer support ring configured to engage an entire 360° circumference of the second receiving surface of the flux shunt, wherein said inner support ring and said outer support ring constitute separate individual rings and further wherein each of said rings has a continuous annular cross section so that the respective engagement provided by the inner and outer rings is circumferentially continuous.

8. The dynamoelectric machine of claim 7 wherein the inner support ring and the outer support ring are spaced apart from one another to define an axial gap in correspondence with the step between the receiving surfaces of the flux shunt.

9. The dynamoelectric machine of claim 7 wherein each ring comprises a magnetically permeable material having a permeability of greater than 1.05 to 1.5 times a permeability of free space.

10. The dynamoelectric machine of claim 7 further comprising a first plurality of bolts engaged about the circumference of the inner support ring to provide primary mechanical clamping of the entire stator core, core-end flux shunts included, with a uniform level of clamping pressure around the circumference.

11. The dynemoelectric machine of claim 7 further comprising a second plurality of bolts engaged about the circumference of the outer support ring to provide supplementary mechanical clamping of the entire stator core, core-end flux shunts included, with a uniform level of damping pressure around the circumference.

12. The dynamoelectric machine of claim 7 wherein the outer support ring comprises a mechanical interface for an assembly for bracing the end turns of a stator winding.

13. An assembly for mechanically clamping a stator core manufactured with laminated steel core-end magnetic flux shunts in a dynamoelectric machine, each flux shunt comprising first and second surfaces for receiving the clamping assembly, said first and second surfaces arranged to define a step, the assembly comprising:

an inner support ring configured to engage an entire 360° circumference of the first receiving surface of the flux shunt; and an outer support ring configured to engage an entire 360° circumference of the second receiving surface of the flux shunt, wherein the respective engagement provided by the inner and outer rings is continuous, and further wherein the inner support ring and the outer support ring are spaced apart from one another to define an axial gap in correspondence with the step between the receiving surfaces of the flux shunt.

14. The assembly of claim 13 wherein each ring comprises a magnetically permeable material having a permeability of up to about 1.5 times permeability of free space.

* * * * *